United States Patent
Imai

(10) Patent No.: US 8,501,360 B2
(45) Date of Patent: Aug. 6, 2013

(54) FUEL CELL OUTPUT CONTROL DEVICE

(75) Inventor: Atsushi Imai, Gamagori (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 351 days.

(21) Appl. No.: 12/740,313

(22) PCT Filed: Oct. 6, 2008

(86) PCT No.: PCT/JP2008/068139
§ 371 (c)(1),
(2), (4) Date: Apr. 28, 2010

(87) PCT Pub. No.: WO2009/057420
PCT Pub. Date: May 7, 2009

(65) Prior Publication Data
US 2010/0255393 A1    Oct. 7, 2010

(30) Foreign Application Priority Data
Oct. 29, 2007  (JP) ................................. 2007-280215

(51) Int. Cl.
*H01M 8/04*    (2006.01)
*H01M 8/00*    (2006.01)

(52) U.S. Cl.
USPC .......................................... 429/428; 429/430

(58) Field of Classification Search
USPC .......................................... 429/428, 430–432
See application file for complete search history.

(56) References Cited

U.S. PATENT DOCUMENTS

| | | | |
|---|---|---|---|
| 7,604,884 B2 * | 10/2009 | Imamura et al. | 429/410 |
| 8,084,151 B2 * | 12/2011 | Umayahara et al. | 429/50 |
| 2003/0184256 A1 * | 10/2003 | Kopf et al. | 320/101 |
| 2007/0018608 A1 * | 1/2007 | Okumura | 320/104 |

FOREIGN PATENT DOCUMENTS

| | | |
|---|---|---|
| DE | 102 58 204 A1 | 2/2004 |
| DE | 696 26 771 T2 | 3/2004 |
| DE | 698 21 588 T2 | 12/2004 |
| DE | 10 2005 039 822 A1 | 3/2006 |
| DE | 10 2006 000 397 A1 | 2/2007 |
| DE | 11 2006 000 895 T5 | 5/2008 |
| JP | 2002-334712 A | 11/2002 |
| JP | 2003-324853 A | 11/2003 |
| JP | 2004-040994 A | 2/2004 |
| JP | 2006-024418 A | 1/2006 |

(Continued)

OTHER PUBLICATIONS

Office Action issued Apr. 27, 2012 in German Patent Application No. 11 2008 002 650.5-45 and English translation thereof.

*Primary Examiner* — Gregg Cantelmo
(74) *Attorney, Agent, or Firm* — Kenyon & Kenyon LLP

(57) ABSTRACT

It is possible to suppress over-discharge of an accumulator even when the accumulator is in charge-limited state in a fuel cell output control device. A vehicle drive control system including a fuel cell and an accumulator uses a control unit having: an FC output instruction value calculation module which calculates an output instruction value of a fuel cell according to a power required by a rotary machine; a regeneration limit judgment module which judges whether regeneration is limited for the rotary machine; a battery limit judgment module which judges whether charge of the accumulator is limited; and a required power correction module which corrects the required power of the fuel cell when the charge of the accumulator is limited and neither of the fuel cell or the rotary machine generates power, so as to limit discharge from the accumulator.

4 Claims, 5 Drawing Sheets

FOREIGN PATENT DOCUMENTS

| | | |
|---|---|---|
| JP | 2006-073506 A | 3/2006 |
| JP | 2006-286305 A | 10/2006 |
| WO | WO 2005/078844 A1 | 8/2005 |
| WO | WO 2008111654 A1 * | 9/2008 |

* cited by examiner

… (1)

FUEL CELL OUTPUT CONTROL DEVICE

This is a 371 national phase application of PCT/JP2008/068139 filed 6 Oct. 2008, claiming priority to Japanese Patent Application No. JP 2007-280215 filed 29 Oct. 2007, the contents of which are incorporated herein by reference.

BACKGROUND OF THE INVENTION

1. Field of the Invention

The present invention generally relates to a fuel cell output control device, and particularly to a fuel cell output control device for driving a rotary machine.

2. Description of the Related Art

Fuel cells, which are environmentally friendly devices, are today provided on many vehicles. Because the fuel cells are not a secondary battery, they are commonly used with a high voltage accumulator to prepare for changes of load. Because it is known that the performance of such high voltage accumulators deteriorates due to overcharging or overdischarging of the accumulator, it is important to maintain an optimal power generation state of the fuel cell corresponding to various load conditions, to prevent overcharging or overdischarging of the high voltage accumulator.

For example, Japanese Patent Laid-Open Publication 2002-334712 (Patent Document 1) discloses a fuel cell system which determines a target power for running a vehicle based on an accelerator value and the like, and also determines a target power generation level for the fuel cell based on a target power of auxiliary devices, a target charge/discharge power quantity of a secondary battery, and a conversion efficiency of a DC to DC converter. In the art described in Patent Document 1, an actual measurement value is used for the conversion efficiency of the DC to DC converter to avoid any influence caused by detection errors of the power consumption of each device or the wiring resistance.

SUMMARY OF THE INVENTION

As described in Patent Document 1, the output instruction value of the fuel cell is calculated according to a torque instruction value which is determined by an accelerator value or the like. Specifically, the output instruction value is set in a manner that the power generation amount of the fuel cell is balanced with a required power to be consumed by the load, thereby preventing the accumulator from entering a state of either overcharging or overdischarging. When the rotary machine is in the regenerative state, the required power of the rotary machine has negative values and the fuel cell suspends power generation.

Even when the rotary machine is in the regenerative state, the regeneration of power may be prohibited or otherwise restricted depending on the condition of the accumulator, so that the rotary machine stops generating power even though it is in the regenerative state. For example, the power generation may stop when an SOC (State of Charge) which indicates a charged state of the accumulator is too high, or when the temperature of the accumulator rises beyond a certain value.

As such, when the rotary machine is in the regeneration-limited state and the accumulator is in the charge-limited state, neither the fuel cell nor the rotary machine generates power. However, as the discharge from the accumulator to auxiliary devices and the like continues, the SOC continues to fall, eventually creating an overdischarged state. In this case, a negative power is required by the rotary machine and the corresponding output instruction value of the fuel cell is set to zero, which may cause the over-discharge state of the accumulator.

An object of the present invention provides a fuel cell output control device which is capable of suppressing over-discharge of the accumulator even when it is in a charge-limited state.

A fuel cell output control device according to the present invention includes output instruction value calculation unit which calculates an output instruction value of a fuel cell according to a power required by a rotary machine, accumulator judgment unit which judges whether or not charge of the accumulator is limited (whether or not the accumulator is in a charge-limited state), and correction means for maintaining the required power of the rotary machine when the accumulator is not in the charge-limited state, while correcting the required power of the rotary machine when it is judged that the accumulator is in the charge-limited state, so as to supply power from the fuel cell to an auxiliary device to limit discharge from the accumulator.

In addition, the output control device of the fuel cell according to the present invention includes a unit which acquires a charge state of the accumulator. When it is judged that the accumulator is in the charge-limited state and that the charge state of the accumulator is at a predetermined special threshold value which is lower than a normal threshold value used for limiting charge in a normal state, the correction unit preferably corrects the required power of the rotary machine to limit discharge from the accumulator.

Further, in the output control device of the fuel cell according to the present invention, the accumulator judgment unit preferably judges that the accumulator is in the charge-limited state when the required power of the rotary machine is a required regeneration power having a negative value and the required regeneration power is limited.

In the above configuration, the output control device of the fuel cell according to the present invention advantageously calculates the output instruction value of the fuel cell based on the required power of the rotary machine, and judges whether or not the accumulator is in the charge-limited state. If the accumulator is not in the charge-limited state, the required power of the rotary machine is maintained. On the other hand, if the charge of the accumulator is limited, the required power of the rotary machine is corrected to cause the fuel cell to supply power to the auxiliary device, thereby limiting discharge from the accumulator. Thus, the power consumption of the auxiliary device is compensated for by the power generation of the fuel cell, and the over-discharge of the accumulator is suppressed.

In addition, the output control device of the fuel cell according to the present invention acquires a charge state of the accumulator when it is in the charge-limited state. When the charge state of the accumulator is at a predetermined special threshold value which is lower than a normal threshold value used for limiting the charge in a normal state, the required power of the rotary machine is corrected to limit discharge from the accumulator. During the charge-limited state, if the SOC is gradually lowered to be at or below the special threshold value, the required power of the rotary machine is corrected so that the fuel cell supplies power to the auxiliary device to limit discharge from the accumulator. Thus, both over-charge and over-discharge of the accumulator can be prevented.

Further, the output control device of the fuel cell judges that the accumulator is in the charge-limited state when the required power for regeneration is limited. For example, if the regeneration of power is prohibited, it is judged that the accumulator is in the charge-limited state.

DETAILED DESCRIPTION OF EXAMPLE EMBODIMENT

A preferred embodiment of the present invention will be described below with reference to the attached drawings. In the following description, a rotary machine is mounted on a vehicle, but other types of rotary machines used in applications other than vehicles, such as a fixed type rotary machine, may be used. Also, a fuel cell vehicle which includes a single rotary machine will be explained, but the vehicle may include more than one rotary machine. Further, while a motor generator which acts as both motor and generator will be explained, the invention may be applied to a motor which acts as a motor alone, or to a vehicle including a separate motor and generator.

In the following description, an example in which both the fuel cell and the rotary machine suspend generation of power due a temperature rise in the accumulator caused by lengthy downhill travelling of the vehicle. However, this is only an exemplary case, and the present embodiment may be applied in other situations, as long as the output instruction value of the fuel cell is determined in the system based on the required power of the rotary machine and power generation by both the fuel cell and the rotary machine are stopped because of the charge-limited state of the accumulator.

Further, a power supply circuit including a high voltage accumulator, a fuel cell, a voltage converter, and a high voltage inverter will be explained, but other components may be added. For example, a system main relay, a low voltage battery, a low voltage DC to DC converter, and the like may also be provided. It is noted that specific values of electrical power or the like will be given below only for the purpose of description and certainly the values may change.

Figure 1:
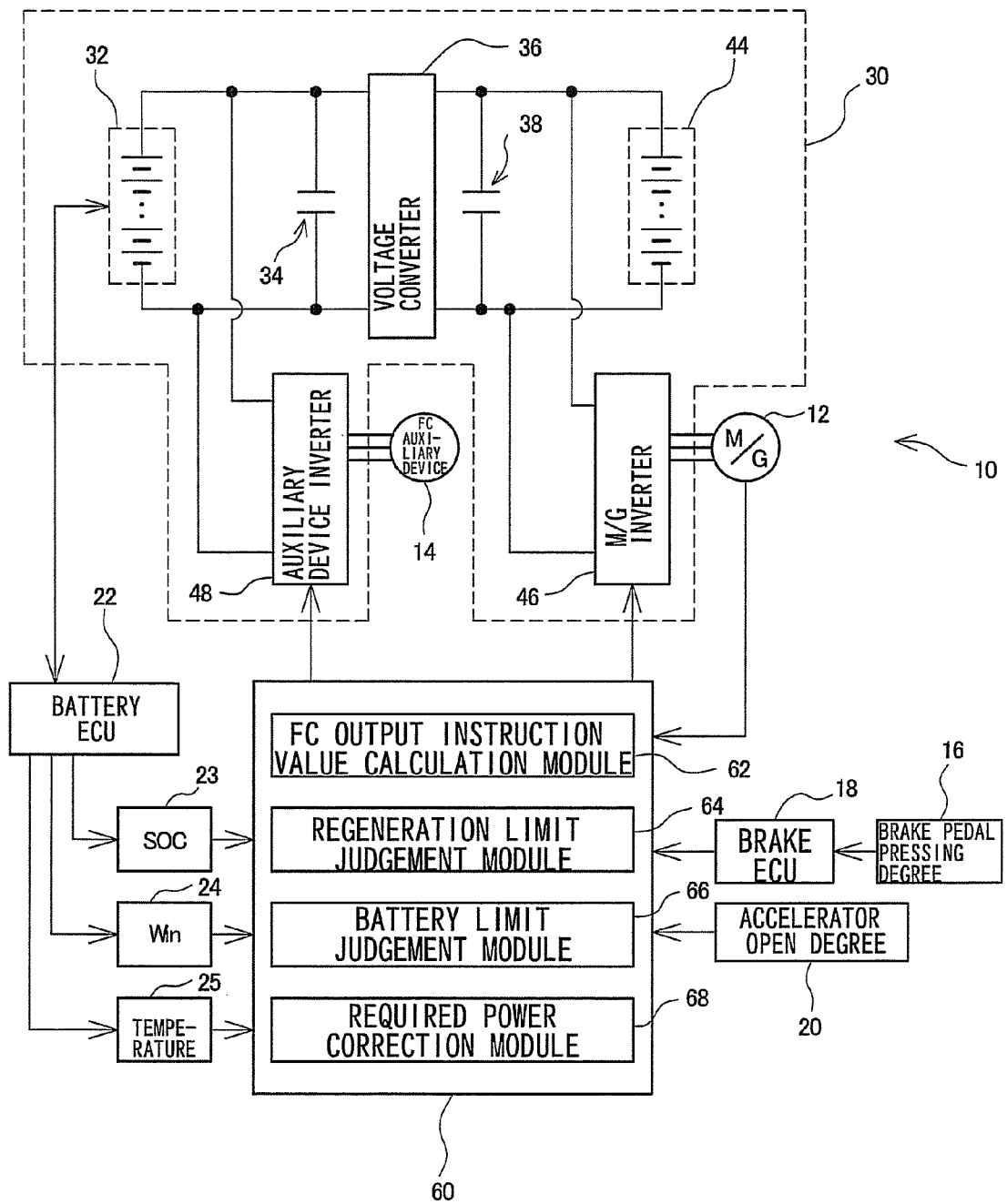
FIG. 1 shows a drive control system of a fuel cell vehicle which includes a fuel cell output control device according to an embodiment of the present invention.

FIG. 1 shows a drive control system 10 of a fuel cell vehicle including a rotary machine. Specifically, the following description is about an example fuel cell output control performed when the temperature of an accumulator has risen to lengthy downhill travelling by the vehicle.

The drive control system 10 includes a power supply circuit 30 consisting of a fuel cell 44 and a secondary battery formed by an accumulator 32, a rotary machine 12 and a fuel cell auxiliary device (FC auxiliary device) 14 which are connected to the power supply circuit 30, a brake pedal pressing degree sensor 16 and a brake ECU (electric control unit) 18 which determine a drive requirement of a vehicle, an accelerator value sensor 20, a battery ECU 22 which controls charge/discharge of the accumulator 32, and a control element 60.

The rotary machine 12 is a motor/generator (M/G), which is a three-phase synchronous type rotary machine mounted on the vehicle, and acts as a motor when electric power is supplied and as a generator during activation of a brake. Revolution of the rotary machine 12 is detected by an appropriate detection means and a detected value is transferred to the control element 60.

The FC auxiliary device 14 includes auxiliary elements used with the fuel cell 44, such as an air compressor (ACP) provided at an oxide gas channel, a hydrogen pump provided at a fuel gas channel, a fuel cell cooling pump, and so on. The FC auxiliary device 14 is activated upon receiving a high voltage power of, for example, at about 200V. It should be noted that "FC" is an abbreviation of "Fuel Cell". Hereinafter, the fuel cell 44 will also be referred to as the "FC".

The power supply circuit 30 is connected to the rotary machine 12 acting as a motor/generator, and the FC auxiliary device 14. The power supply circuit supplies power to the rotary machine 12 when it acts as a drive motor, and receives regenerated power when the rotary machine 12 acts as a generator and supplies the power to the secondary battery or the accumulator 32 for charging. In addition, the power supply circuit supplies a high voltage power necessary to activate the FC auxiliary device 14.

The power supply circuit 30 includes a secondary battery formed by the accumulator 32, a smoothing capacitor 34 provided at the accumulator side, a voltage converter 36, a smoothing capacitor 38 provided at the fuel cell side, the fuel cell 44, an M/G inverter 46 connected to the rotary machine 12, and an auxiliary device inverter 48 connected to the FC auxiliary device 14.

The accumulator 32 is a high voltage secondary battery capable of charging and discharging power. The accumulator 32 supplies and receives power to and from the fuel cell 44 via a voltage converter 36, to respond to changes of the load of the rotary machine 12, the FC auxiliary device 14, and the like. The accumulator 32 may be formed by a lithium ion assembled battery or a nickel-hydride assembled battery having a terminal voltage of about 200V to about 300V, or a capacitor or the like may also be used. It is noted that the accumulator 32 is generally known as a high voltage battery, and that the term "battery" is commonly used to refer to the accumulator 32. Therefore, hereinafter the accumulator 32 will also be referred to as the "battery".

The voltage converter 36 is a circuit to exchange high voltage power between the accumulator 32 and the fuel cell 44. For example, when the accumulator 32 is used to assist driving of the rotary machine, a high voltage power is converted and supplied from the accumulator 32 to the fuel cell 44. On the other hand, to charge the accumulator 32, a high voltage power is converted and supplied from the fuel cell 44 to the accumulator 32. The voltage converter 32 may be formed by a bidirectional converter having a reactor.

A smoothing capacitor is provided on each side of the voltage converter 36. Specifically, a smoothing capacitor 34 is provided on the accumulator side between the positive pole bus and the negative pole bus connecting the voltage converter 36 and the accumulator 32, and a smoothing capacitor 38 is provided on the fuel cell side between the positive pole bus and the negative pole bus connecting the voltage converter 36 and the fuel cell 44.

The fuel cell 44 is also referred to as "the fuel cell stack" as this is a common type of battery assembly used to provide a voltage of about 200V to about 400V. Each fuel cell in such a stack uses hydrogen supplied to the anode side as a fuel gas and air supplied to the cathode side as an oxide gas to generate a necessary power by a battery chemical reaction through an electrolyte film formed by a solid polymer film. To operate the fuel cell 44, it is preferable that the above described FC auxiliary device 14 be activated.

The M/G inverter 46 is a circuit operated under the control of the control element 60, which converts a high voltage direct power to a three phase alternating driving power and supplies it to the rotary machine 12, and also converts a three phase alternating regenerated power received from the rotary machine 12 to a high voltage direct charging power. The M/G inverter 46 may be configured by a circuit including switching elements, diodes, and other components.

The auxiliary device inverter 48 is also operated under the control of the control element 60, which converts a high voltage direct power to a three phase alternating driving power and supplies it to the FC auxiliary device 14. The auxiliary device inverter 48 is otherwise essentially similar to the M/G inverter 46.

The elements connected to the control element 60 will be described. The brake pedal pressing degree sensor 16 detects a degree of depression of the brake pedal or the like. The brake ECU 18 is used herein to receive a detected value of the brake pedal pressing degree sensor 16 to convert it to a required brake torque for the rotary machine 12, and enters the torque into the control element 60. The accelerator value sensor 20 detects an activated amount of the accelerator pedal or the like, converts it to the required driving torque for the rotary machine 12, and enters the torque into the control element 60. As such, the brake pedal pressing degree sensor 16 and the accelerator value sensor 20 are means operated by users to indicate the required torque needed for the rotary machine 12.

The battery ECU 22 is a control device which detects the state of the accumulator 32, which is a high voltage battery, and controls it to be at an optimal charge/discharge state. From the battery ECU 22, an SOC (State of Charge) 23, a chargeable amount of power (Win) 24, a temperature 25, and the like are transferred to the control element 60 as state quantity of the accumulator 32.

While the control element 60 is generally capable of controlling all elements of the drive control system 10, in connection with the present embodiment it specifically controls the output of the fuel cell to prevent over-discharge of the accumulator 32 when the temperature of the accumulator is raised by continuous traveling of the vehicle on the downhill lane. In this sense, the control element 60 acts as the output control device of the fuel cell in the drive control system 10 for vehicles. The control element 60 includes an FC output instruction calculation module 62 which calculates an output instruction value of the fuel cell 44 according to a power required by the rotary machine 12, a regeneration limit judgment module 64 which judges whether regeneration of the rotary machine 12 is limited, a battery limit judgment module 66 which judges whether charge of the accumulator 32 is limited, and a required power correction module 68 which corrects the required power of the fuel cell when the charge of the accumulator 32 is limited and neither of the fuel cell 44 or the rotary machine 12 generates power, so as to limit discharge from the accumulator 32.

The control element 60 can be a vehicle mountable computer. The control element 60 may be a separate computer, but it is also possible to include the functions of the control element 60 as part of a vehicle ECU or the like. Each function of the control element 60 described above can be realized as software by executing, for example, a corresponding fuel cell output program.

Figure 2:
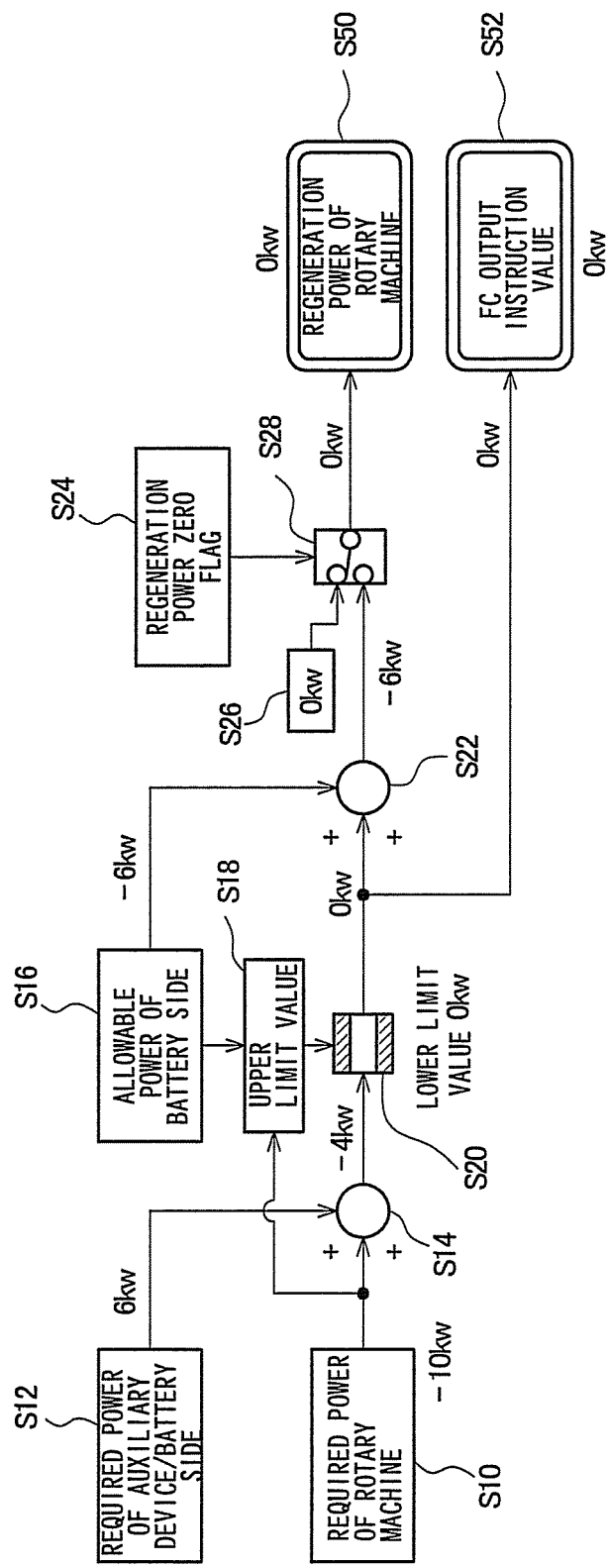
FIG. 2 is a block diagram illustrating a fuel cell output instruction according to a conventional system.
Figure 3:
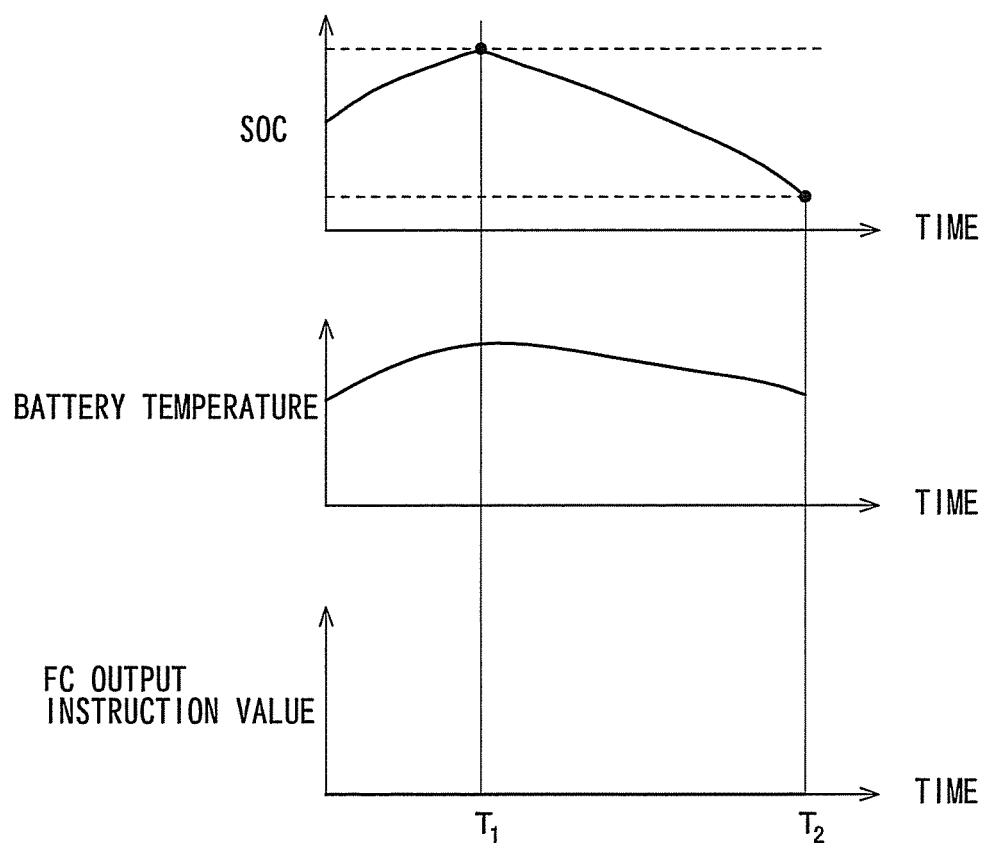
FIG. 3 is a graph illustrating the condition of each factor in the conventional system of FIG. 2.
Figure 4:
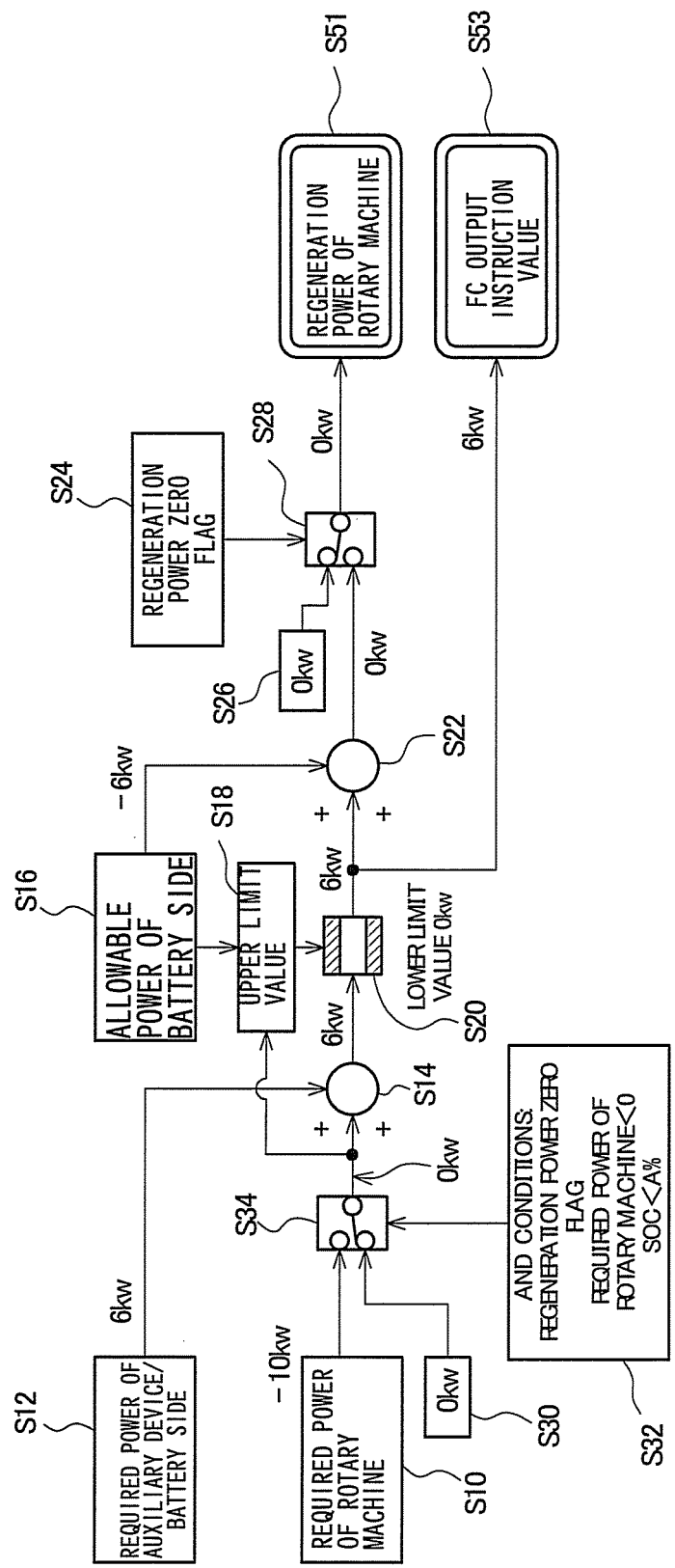
FIG. 4 is a block diagram illustrating a fuel cell output instruction according to an embodiment of the present invention.
Figure 5:
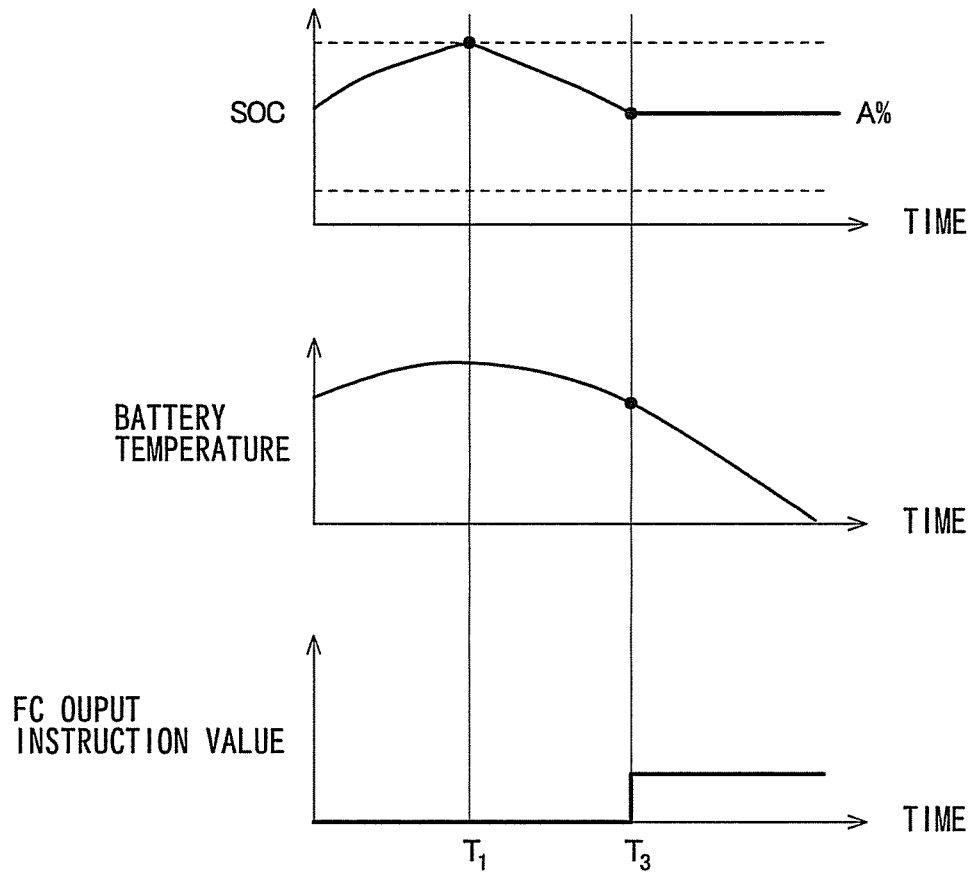
FIG. 5 is a graph illustrating the condition of each factor in the embodiment of the present invention.

Referring to FIGS. 2-4, the process steps to be carried out in the above configuration, especially the functions of the control element 60 will be described in comparison with the conventional configuration. Reference numbers indicated in FIG. 1 will be used throughout the description below. FIG. 2 is a block diagram of the conventional configuration and FIG. 3 is a graph for explaining the state of each component thereof, both figures being used for the purpose of comparison. In contrast, FIG. 4 is a block diagram of the configuration set forth above and FIG. 5 is a graph for explaining the state of each component of such configuration. Although FIGS. 2 and 4 are block diagrams illustrating the functions concerning the output control of the fuel cell in blocks, the procedure for controlling the output of the fuel cell will be described below. Therefore, the procedure shown in FIG. 4 corresponds to the process steps of the output control program of the fuel cell.

It should be noted that, in the conventional configuration, the control element 60 of FIG. 1 does not have the function of the required power correction module 68 and only has other functions, such as the FC output instruction value calculation module 62. Therefore, it is possible in the conventional configuration that the accumulator 32 becomes over-discharged by discharging power to the auxiliary devices and the like when the charge of the accumulator 32 is limited.

Referring to FIGS. 2 and 3, an example conventional configuration will be described. When, in such a configuration, the accumulator 32 is in the charge-limited state because the temperature of the accumulator is raised by continuous traveling of a vehicle on the downhill lane, generation of power by the fuel cell 44 is suspended to limit the charge of the accumulator 32, and regeneration of the rotary machine 12 is prohibited, so that all power generation is halted. Because of the high temperature, the prohibited regeneration is not cancelled until the temperature is lowered to a predetermined level. How the output control of the fuel cell 44 is performed in such a situation will be described.

In FIG. 2, a value of the required power of the rotary machine is calculated (S10). In this example, because the vehicle is traveling on a downhill slope, the rotary machine 12 is in the regenerative state. If the required power of the rotary machine has positive values when power is used for driving the motor and has negative values during regeneration of power, the required power of the rotary machine in this example has a negative value. This is indicated as "−10 kW" in FIG. 2.

Then, a value of power required from the auxiliary device/battery side, i.e., the power required by the auxiliary device for the accumulator, is calculated (S12), and the obtained value is added to the value of the required power of the rotary machine (S14). The calculated sum is the power required by the entire vehicle driving system, i.e., the required power of the system. In FIG. 2, the required power of the auxiliary device/battery side is indicated as +6 kW, so the required power of the system is indicated as "−10 kW+6 kW=−4 kW".

Next, a value of the allowable power of the battery side, which is the power that the accumulator 32 is allowed to output, is calculated (S16). The allowable power of the battery side is judged by the judgment function of the battery limit judgment module 66 of the control element 60 based on the conditions of the accumulator 32, such as the SOC 23, the Win 24, and the temperature 25. In the present example, because the vehicle is in the continuous downhill mode and the accumulator 32 is at a high temperature, the accumulator 32 is in the charge-limited state, so that the charge of regenerated power or the like by the rotary machine 12 is limited and only the discharge is allowed. Therefore, the allowable power of the battery side in S16 corresponds to the required power of the auxiliary device/battery side in S12, and is indicated as "−6 kW" in FIG. 2. Specifically, it is judged that the accumulator 32 is in the charge-limited state, and the power equivalent to the power consumption of the auxiliary device is being discharged from the accumulator 32.

Then, an upper limit is determined between the required power of the rotary machine and the allowable power of the battery side (S18), to control the upper and lower limit of the required power of the system, with a lower limit being set to 0 kW (S20). The obtained value becomes an FC output instruction value which is the output instruction value of power generated by the fuel cell 44 (S52). In the example of FIG. 2, the upper limit value is −4 kW in S18, and both upper and lower limit control is 0 kW in S20. As a result, the FC output instruction value becomes 0 kW. Specifically, when the rotary machine 12 is in the regenerative state, it consumes no power, so that the power generation of the fuel cell 44 is stopped. The processing associated with the steps until this point is carried out by the function of the FC output instruction calculation module 62 of the control element 60.

Then, the FC output instruction value is added to the value of the allowable power of the battery side (S22). The obtained sum becomes the regeneration power required for the rotary machine 12 (S50). In FIG. 2, this value is −6 kW. If the regeneration power is limited and the regenerative operation is prohibited, this value is not passed to the rotary machine 12 and is forced to 0 kW.

Specifically, depending on whether or not a regeneration power zero flag which is to be set when the regeneration of power is prohibited is detected (S24), a selection is made between 0 kW (S26) and the sum of S22 (S28), and a selection result becomes a value of the regeneration power of the rotary machine (S50). The selection carried out in S28 will be described.

Specifically, when no regeneration power zero flag is set, the regeneration operation is not prohibited, and the sum obtained in S22 is given as the value of the regeneration power of the rotary machine 12. On the other hand, if the regeneration power zero flag is set, the regeneration operation is prohibited, and the value of the regeneration power is forced to 0 kW and the power generation of the rotary machine 12 is stopped.

The presence or absence of the regeneration power zero flag is judged by the judgment function of the regeneration limit judgment module 64 of the control element 60 based on the conditions of the accumulator 32, such as the SOC 23, the Win 24, and the temperature 25. In this case, because the vehicle is traveling on the downhill lane and the accumulator 32 is at a high temperature, the accumulator 32 is in the charge-limited state and is not able to receive the regeneration power from the rotary machine 12. In response to this, the regeneration power zero flag is set. Therefore, the power generation is prohibited in the rotary machine 12 even though it is in the regenerative state, and the value of the regeneration power of the rotary machine is set to 0 kW in S50.

As described above, in the conventional configuration of FIG. 2, when the vehicle is continuously traveling on the downhill lane and the temperature of the accumulator 32 is raised, the rotary machine 12 is in the regenerative state and power generation of the fuel cell is stopped, so that the regeneration power zero flag is set to stop power generation of the rotary machine 12. However, the discharge of power from the accumulator 32 is continued in order to respond to the required power of the auxiliary device. The accumulator 32 continues the discharge until the prohibition of power regeneration is canceled or the regeneration power zero flag is unset when the temperature 25 of the accumulator 32 drops to an appropriate temperature.

This will be explained referring to FIG. 3. Reference numbers used in FIGS. 1 and 2 will also be used in the description below. In the graph of FIG. 3, the horizontal axis represents the time and the vertical represents the SOC, the temperature of battery, and the FC output instruction value. The graph shows how the SOC, the temperature of battery, and the FC output instruction value change during the continuous traveling of a vehicle on the downhill lane and at the high temperature of the accumulator 32.

When the vehicle continuously travels downhill, the rotary machine 12 is in the regenerative state and no power supply is needed from the fuel cell 44 to the rotary machine 12, so that the FC output instruction value is set to zero, as described in connection with S52 of FIG. 2.

Because the rotary machine 12 is in the regenerative state, it continues power generation, causing the SOC to gradually rise. The temperature of the battery also rises gradually. When the SOC and the temperature of the battery reach predetermined threshold values, the charge is limited to prevent overcharge of the accumulator 32 or the like, and the regeneration power zero flag is set. In FIG. 3, the regeneration operation is prohibited at time $T_1$. Specifically, the regeneration power zero flag described above in connection with S24 of FIG. 2 is set, and the regeneration power of the rotary machine is also set to zero as described at S50.

When regeneration is prohibited, the SOC should drop by the discharge from the accumulator 32 to the auxiliary device and the like, and the regeneration stop is cancelled. However, if the high temperature of the battery is maintained due to lengthy descent of the vehicle or the like, the regeneration stop is not cancelled because of the high temperature condition even when the SOC is lowered, and the regeneration power zero flag remains set. In this state, power generation is stopped in both the fuel cell 44 and the rotary machine 12, so that no power is supplied to the accumulator 32, and the discharge to the auxiliary device and the like is continued. Although the SOC of the accumulator 32 is continuously lowered, the temperature of the battery remains high as a result of the constant discharge. As a result, there is a risk that the SOC will enter the over-discharged state and the vehicle may eventually stop at time $T_2$.

Referring to FIGS. 4 and 5, the configuration of FIG. 1 will be described. Reference numerals used in FIGS. 1-3 will also be used below, and the detailed description thereof will not be repeated. As shown in FIG. 4, the process steps until the required power of the system is determined at S14 are different from the conventional configuration described and shown in FIG. 2, so that the different output instruction value is given (S53).

Specifically, because in the configuration of FIG. 4 the vehicle is also traveling downhill, the rotary machine 12 is in the regenerative state. As to the required power of the rotary machine, positive values represent when power is used for driving the motor and negative values represent regeneration of power, so the required power of the rotary machine also has a negative value as in FIG. 2 and indicated as −10 kW in FIG. 4.

Next, a determination is made as to whether the value of the required power of the rotary machine is to be used directly, or whether the value should be forced to 0 kW (S34). The determination is made based on an AND operation performed on more than one condition. Here, three conditions are used in the AND operation. A first condition is that the regeneration power zero flag is set, i.e., the regeneration is prohibited. A second condition is that the required power of the rotary machine has a negative value, i.e., the rotary machine is in the regenerative state. A third condition is that the SOC is at or below a special threshold value of A%, i.e., the accumulator 32 has discharged to a certain level.

It is noted that the special threshold value, A%, of the SOC is set lower than the usual threshold value used to limit the charging operation in a normal state. For example, if the normal threshold value of the SOC is 60%, A% may be set to 50%. The threshold value of the SOC is set to a value lower than the normal threshold value in order to prevent overcharge of the accumulator 32, to thereby minimize reception of the regenerated power and maintain the accumulator 32 in the discharge state.

If the result of the AND operation based on these three conditions is 1, the required power value of the rotary machine is forced to 0 kW. When the vehicle is continuously traveling on the downhill lane and the temperature of the battery is raised, the first and second conditions are satisfied, and, when the SOC drops to A%, the AND results of all three conditions is returned 1 and the required power for the rotary machine is set to 0 kW.

Similarly to the process steps described in FIG. 2, the required power of the auxiliary device/battery side, which is the power required by the auxiliary device for the accumulator, is then calculated (S12), and the obtained value is added to the previously obtained required power of the rotary machine (S14). The calculated sum is the required power of the entire vehicle driving system, i.e., the required power of the system. In FIG. 4, the required power of the auxiliary device/battery side is indicated as +6 kW, as in FIG. 2, and if the required value of the rotary machine is 0 kW, the required power of the system is 0 kW+6 kW=+6 kW. In the conventional configuration of FIG. 2, the required power of the system was −4 kW. Subsequently, the operation follows the same steps as those described above with reference to FIG. 2, and the FC output instruction value is determined to be +6 kW (S53). This value matches the required power of the auxiliary device/accumulator side. That is, the power required by the auxiliary device is compensated for by the fuel cell 44. As to the regeneration power of the rotary machine, the result is 0 kW (S51) as in FIG. 2.

Thus, the FC output instruction value is corrected according to the result of an AND operation based on three conditions. This operation is performed by the required power correction module 68 in the control element 60. As a result, the fuel cell 44 starts power generation and the generated power is supplied to the FC auxiliary device 14 and the like, thereby suppressing the discharge from the accumulator 32.

The condition of each factor in the above operation is illustrated in FIG. 3. As in FIG. 5 corresponding to FIG. 5, the regeneration of power is prohibited at time $T_1$, where the accumulator 32 continues discharge and the SOC continuously drops. In the configuration shown in FIG. 5, however, the SOC reaches the special threshold value of A% at time $T_3$. Because at time $T_3$ the result of the AND operation on the three conditions described in FIG. 4 is 1, the FC output instruction value is corrected from 0 kW to a value corresponding to the required power of the auxiliary device/battery side. In this example, the FC output instruction value is corrected from 0 kW to +6 kW.

After time $T_3$, the required power of the auxiliary device is supplied from the fuel cell 44. As a result, the discharge of the accumulator 32 is halted, the rise of the SOC is arrested, and the falling of the battery temperature is accelerated. As a result, the possibility of over-charge of the accumulator 32 as described above while referring to FIG. 3 is reliably prevented.

PARTS LIST

10: Drive Control System
12: Rotary Machine
14; FC Auxiliary Device
16: Brake Pedal Pressing Degree Sensor
18: Brake ECU
20: Accelerator Value Sensor
22: Battery ECU
23: SOC
24: Win
25: Temperature
30: Power Supply Circuit
32: Accumulator
34,38: Smoothing Capacitor
36: Voltage Converter
44: Fuel Cell
46: M/G Inverter
48: Auxiliary Device Inverter
60: Control Element
62: FC Output Instruction Value Calculation Module
64: Regeneration Limit Judgment Module
64: Regeneration Limit Judgment Module
66: Battery Limit Judgment Module
68: Required Power Correction Module

What is claimed is:

1. A vehicle comprising:
a fuel cell;
a motor/generator that is capable of operating as both a motor and a generator for producing regenerative power;
an accumulator that can be charged by power from the fuel cell and charged by regeneration power from the motor/generator;
an auxiliary device that can receive power from the fuel cell and the accumulator; and
a fuel cell output control device that is programmed to:
calculate a power required by the motor/generator, with a positive value indicating power used for driving the motor, and a negative value indicating output of regeneration power to the accumulator;
calculate a power required by the auxiliary device; and
calculate an output instruction value of the fuel cell according to the sum of the required power of the motor/generator and the required power of the auxiliary device, wherein a positive output instruction value is an instruction for the fuel cell to generate power;
judge whether or not the accumulator is in a charge-limited state in which charging of the accumulator is reduced or prohibited even though the accumulator is not fully charged because the accumulator exceeds a threshold temperature;
change the required power of the motor/generator to zero if (i) the sum of the required power is a negative value, and (ii) the accumulator is in the charge-limited state, thereby stopping the supply of power from the accumulator to the auxiliary device and having the auxiliary device powered by the fuel cell.

2. The vehicle of claim 1, wherein the fuel cell output control device is further programmed to obtain a power charged in the accumulator, and changing of the required power of the motor/generator to zero if the power charge of the accumulator is at or below a predetermined special threshold value which is lower than a normal threshold value for limiting charge when the accumulator is not in a charge-limited state.

3. A method for controlling a vehicle that comprises a fuel cell, a motor/generator that is capable of operating as both a motor and a generator, an accumulator that can be charged by power from the fuel cell and charged by regeneration power from the motor/generator, and an auxiliary device that can receive power from the fuel cell and the accumulator, the method comprising:
- calculating a power required by the motor/generator, with a positive value indicating power used for driving the motor, and a negative value indicating output of regeneration power;
- calculating a power required by the auxiliary device; and
- calculating an output instruction value of the fuel cell according to the sum of the required power of the motor/generator and the required power of the auxiliary device, wherein a positive output instruction value is an instruction for the fuel cell to generate power;
- judging whether or not the accumulator is in a charge-limited state in which charging of the accumulator is reduced or prohibited even though the accumulator is not fully charged because the accumulator exceeds a threshold temperature; and
- changing the required power of the motor/generator to zero if (i) the sum of the required power is a negative value, and (ii) the accumulator is judged to be in the charge-limited state, thereby stopping the supply of power from the accumulator to the auxiliary device and having the auxiliary device powered by the fuel cell.

4. The method of claim 3, further comprising:
- obtaining a power charged in the accumulator; and
- changing the required power of the motor/generator to zero if the power charge of the accumulator is at or below a predetermined special threshold value which is lower than a normal threshold value for limiting charge when the accumulator is not in a charge-limited state.

* * * * *

UNITED STATES PATENT AND TRADEMARK OFFICE
CERTIFICATE OF CORRECTION

PATENT NO.       : 8,501,360 B2
APPLICATION NO. : 12/740313
DATED            : August 6, 2013
INVENTOR(S)      : Atsushi Imai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this

Fifteenth Day of September, 2015

Michelle K. Lee
*Director of the United States Patent and Trademark Office*